(No Model.)
J. PATTEN.
TAP AND DIE.
No. 310,462. Patented Jan. 6, 1885.
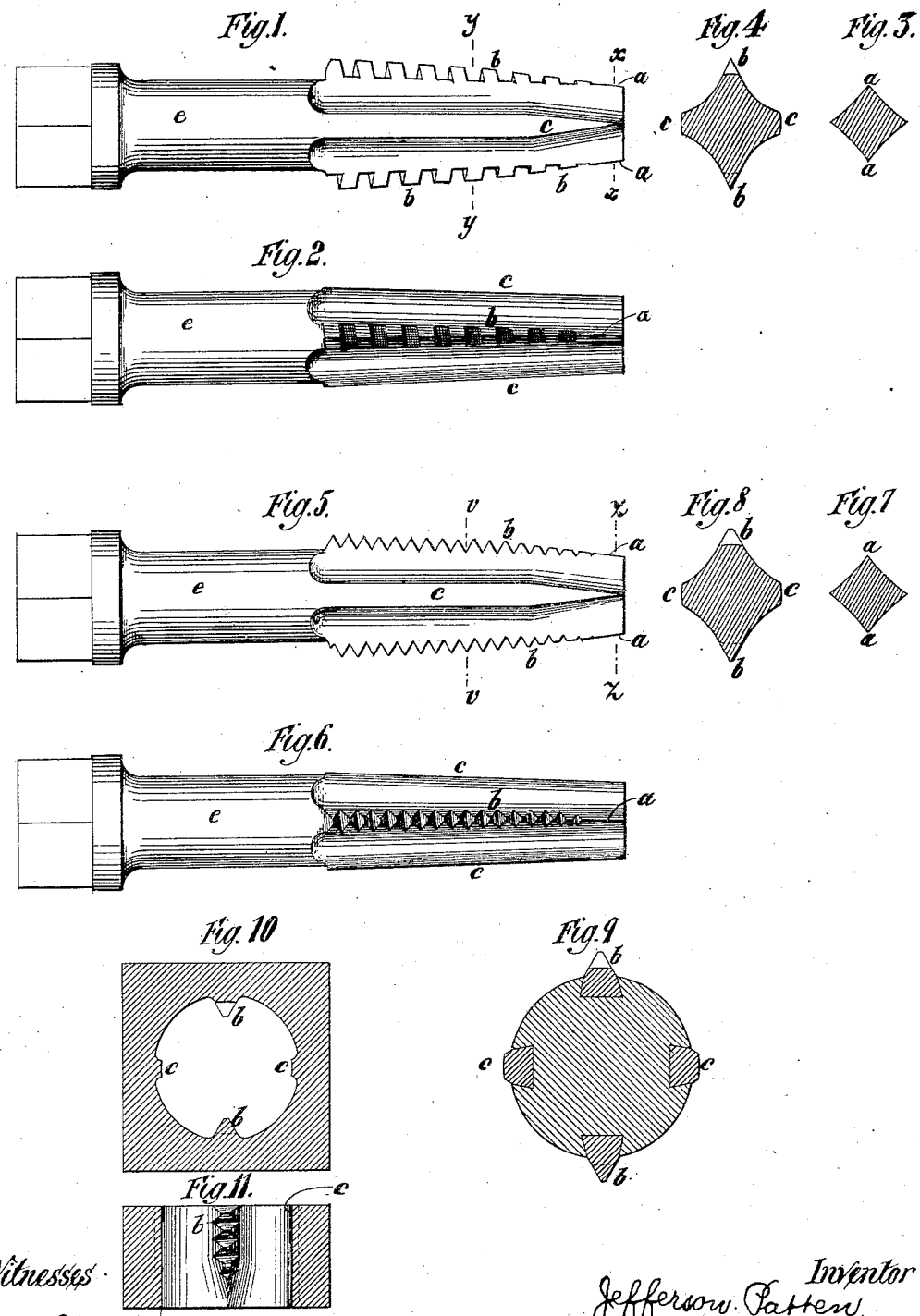
Witnesses
James R Bowen
Wm. G. Lipsey
Inventor
Jefferson Patten,
by his attorneys
Gifford & Brown

UNITED STATES PATENT OFFICE.

JEFFERSON PATTEN, OF BROOKLYN, ASSIGNOR TO ANNA M. PATTEN, OF NEW YORK, N. Y.

TAP AND DIE.

SPECIFICATION forming part of Letters Patent No. 310,462, dated January 6, 1885.

Application filed April 2, 1884. (No model.)

*To all whom it may concern:*

Be it known that I, JEFFERSON PATTEN, of Brooklyn, in Kings county and the State of New York, have invented a certain new and useful Improvement in Taps and Dies, of which the following is a specification.

The object of my improvement is to produce a tap or die whereby screw-threads running in either of two directions may be formed.

In the accompanying drawings, Figure 1 is a side view of a tap embodying my improvement. Fig. 2 is a side view thereof, looking at it from a different position. Fig. 3 is a transverse section of the same taken on the line $x\ x$, Fig. 1. Fig. 4 is a transverse section taken on the line $y\ y$, Fig. 1. Fig. 5 is a side view of a tap of modified form. Fig. 6 is a side view of this tap, looking at it from a different position. Fig. 7 is a transverse section taken at the plane of the dotted line $z\ z$, Fig. 5. Fig. 8 is a transverse section taken on the plane of the dotted line $v\ v$, Fig. 5. Fig. 9 is a transverse section of a tap of modified form embodying my improvement. Fig. 10 is a transverse section of a die embodying my improvement; and Fig. 11 is a sectional view of this die, taken in a plane at right angles to Fig. 10.

Similar letters of reference designate corresponding parts in all the figures.

In Figs. 1, 2, 3, and 4 I have shown a tap adapted to cut a square thread. As shown, it has leading or reaming points $a$. It is also provided with cutting-teeth $b$, arranged in two rows extending in the direction of the axis of the tap. Intermediate of these rows of teeth are bearing-ribs $c$, also extending in the direction of the axis of the tap. The teeth in each row are arranged at distances apart corresponding to the pitch of the screw-thread to be produced. The teeth near the leading-points $a$ project but slightly; but the next teeth project successively more and more until those nearest the shank $e$ of the tap project the full extent of the screw-thread to be cut. The sides of the teeth which are in planes extending approximately lengthwise of the tap converge outwardly, so that the teeth taper in radial directions. The intermediate sides of said teeth, which extend transversely to the length of the tap, are perpendicular to the axis of the tap. At the junction of the sides which are in planes extending approximately lengthwise of the tap with the intermediate sides, which extend transversely to the length of the tap, cutting-edges are formed. The outer extremities of the teeth, owing to the outward taper of the teeth, also form cutting-edges. The teeth at their bases are of such extent transversely to the length of the tap that they will not give direction to the tap, so that it will turn one way only. The teeth at their outer extremities have as great an extent in the direction of the length of the tap as the teeth have in that direction at their bases. The teeth in one row are not arranged in line with those of the other row, but in intermediate positions. Owing to the short extent of the teeth transversely to the length of the tap and the relative arrangement of the two rows, the tap may be turned in reverse directions, so as to cut screw-threads running in different directions. The bearing-ribs $c$ do not extend farther from the axis of the tap than the bases of the teeth $b$; hence they will impinge against the edge of the thread cut. The teeth of the tap may be formed by cutting a screw-thread upon the tap and then removing the portions of the tap where the thread is not wanted. They are not necessarily formed in this manner; but I have found this a convenient way to space them, as thereby the work of laying out the teeth is facilitated. The teeth are so short in a direction transverse to the length of the tap-body that the incline which they have, owing to the making of them in the manner described, is immaterial, especially as this incline is not appreciable at the extremities of the teeth, or portions farthest from the axis of the tap-body, which is the portion of the teeth forming their initial cutting points or edges.

In Figs. 5, 6, 7, and 8 I have shown a tap adapted to cut a V screw-thread. It is like the tap before described, except that the teeth taper outward from their bases on all four sides.

In Fig. 9 I have shown a tap in which the rows of teeth $b$ and the bearing-ribs $c$ are made separate from the body of the tap and dovetailed into the same. The rows of teeth may be adjusted lengthwise relatively to each other in this example of the improvement.

In Figs. 10 and 11 I have shown a die having in its interior teeth $b$ and bearing-ribs $c$. As these teeth are designed for cutting a V screw-thread they correspond with the teeth of the tap which is illustrated in Figs. 5, 6, 7, and 8. For cutting a square screw-thread the teeth would be made to correspond with the teeth of the tap shown in Figs. 1, 2, 3, and 4. There will preferably be leading-points $a$ in either case.

I do not wish to be confined to the use of but two rows of teeth, as more than two rows may be used.

What I claim as my invention, and desire to secure by Letters Patent, is—

A tap or die having rows of teeth so disposed that the teeth in each row will alternate with those in the other row, the teeth being so constructed that they will taper radially, or, in other words, in the direction of their projection, and that they will have so short an extent in a direction transverse to the length of the tap that the tap may be rotated to the right or the left for the purpose of cutting a screw-thread in either direction, substantially as specified.

JEFFERSON PATTEN.

Witnesses:
T. J. KEANE,
WM. G. LIPSEY.